United States Patent
Takazawa

(10) Patent No.: US 10,604,972 B2
(45) Date of Patent: Mar. 31, 2020

(54) FUEL LID STRUCTURE

(71) Applicant: TOYOTA JIDOSHA KABUSHIKI KAISHA, Toyota-shi, Aichi-ken (JP)

(72) Inventor: Kazuya Takazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 15/711,604

(22) Filed: Sep. 21, 2017

(65) Prior Publication Data
US 2018/0142505 A1    May 24, 2018

(30) Foreign Application Priority Data
Nov. 18, 2016 (JP) ................... 2016-225314

(51) Int. Cl.
*E05B 83/34* (2014.01)
*B60K 15/05* (2006.01)
*E05B 81/34* (2014.01)
*E05B 15/04* (2006.01)
*E05B 81/06* (2014.01)

(52) U.S. Cl.
CPC .............. *E05B 83/34* (2013.01); *B60K 15/05* (2013.01); *B60K 2015/053* (2013.01); *B60K 2015/0561* (2013.01); *B60K 2015/0576* (2013.01); *B60K 2015/0584* (2013.01); *E05B 81/06* (2013.01); *E05B 81/34* (2013.01); *E05B 2015/0437* (2013.01); *E05B 2015/0458* (2013.01)

(58) Field of Classification Search
CPC ............ B60K 15/05; B60K 2015/0576; B60K 2015/0584; B60K 2015/053; B60K 2015/0569; E05B 83/34
See application file for complete search history.

(56) References Cited

U.S. PATENT DOCUMENTS 4,525,004 A * 6/1985 Tanaka ................... B60K 15/05
                                                    292/171
5,044,678 A * 9/1991 Detweiler ............. E05B 47/026
                                                    292/144
(Continued)

FOREIGN PATENT DOCUMENTS

JP   H09-100668 A    4/1997
JP   2012-162188 A   8/2012
(Continued)

*Primary Examiner* — Justin B Rephann
(74) *Attorney, Agent, or Firm* — Oliff PLC

(57) ABSTRACT

A fuel lid structure that includes: a lid body at which a latched portion is formed, the lid body opening and closing an open portion formed in a vehicle body outer panel for access to a fuel fill inlet; a lid lock having: a lock member provided so as to be movable between a latching position in which the lock member latches with the latched portion and a retracted position in which the lock member is retracted from the latched portion, and an urging member that urges the lock member toward the latched portion, the lid lock locking the lid body in a closed position in a case in which the latched portion is latched by the lock member; and an attenuating member provided at the latched portion, the attenuating member contacting the lock member to attenuate the urging force that acts on the lock member.

5 Claims, 10 Drawing Sheets

(56) References Cited

U.S. PATENT DOCUMENTS

| | | | | |
|---|---|---|---|---|
| 5,080,421 A | * | 1/1992 | Otowa | B60K 15/03504 296/97.22 |
| 5,664,811 A | | 9/1997 | Martus et al. | |
| 5,676,416 A | * | 10/1997 | Cooper | B60J 5/06 292/DIG. 46 |
| 5,884,958 A | * | 3/1999 | Oddenino | B60K 15/04 296/97.22 |
| 6,189,959 B1 | * | 2/2001 | VanAssche | B60K 15/05 16/86 B |
| 6,234,557 B1 | * | 5/2001 | Bae | B60K 15/0406 220/86.2 |
| 6,499,789 B2 | * | 12/2002 | Moll | B60K 15/05 292/28 |
| 7,905,535 B2 | * | 3/2011 | Zentner | B60K 15/05 296/97.22 |
| 7,914,063 B2 | * | 3/2011 | Lederer | B60K 15/04 292/207 |
| 10,118,481 B1 | * | 11/2018 | Burnett | B60K 15/05 |
| 10,196,841 B2 | * | 2/2019 | Kitamura | E05B 83/34 |
| 2005/0194810 A1 | * | 9/2005 | Beck | B60K 15/04 296/97.22 |
| 2012/0047807 A1 | * | 3/2012 | Lee | B60K 15/05 49/349 |
| 2013/0134737 A1 | | 5/2013 | Ogata et al. | |
| 2013/0249234 A1 | * | 9/2013 | Higgins | B60K 15/05 296/97.22 |
| 2013/0257089 A1 | * | 10/2013 | Minock | B60K 15/05 296/97.22 |
| 2015/0183316 A1 | | 7/2015 | Wakamatsu et al. | |

FOREIGN PATENT DOCUMENTS

| | | |
|---|---|---|
| JP | 2013-112144 A | 6/2013 |
| JP | 2015-123883 A | 7/2015 |

* cited by examiner

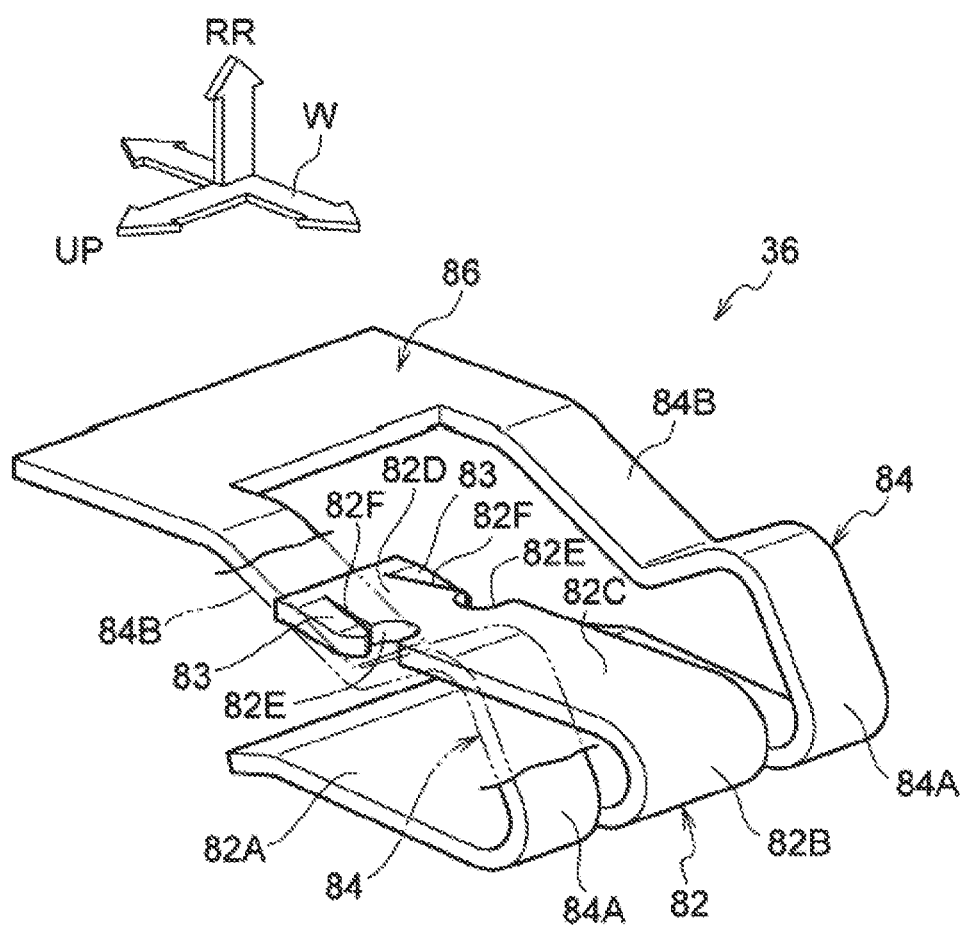

FUEL LID STRUCTURE

CROSS-REFERENCE TO RELATED APPLICATION

This application claims priority under 35 USC 119 from Japanese Patent Application No. 2016-225314 filed on Nov. 18, 2016, the disclosure of which is incorporated by reference herein.

BACKGROUND

Technical Field

The technology of the present disclosure relates to a fuel lid structure.

Related Art

Japanese Patent Application Laid-open (JP-A) No. 2015-123883 discloses a fuel filler lid structure having a door hook that is urged in an extension direction by a hook return spring to thereby lock in a closed state a fuel filler lid and is operated to contract by a door motor to thereby unlock the fuel filler lid. The door hook contacts a door bracket secured to the fuel filler lid.

There is a fuel lid structure where a distal end portion of a lock member urged by an urging member of a lid lock latches a latched portion provided in a lid body, whereby the lid body is retained in a closed position. Here, because the lock member is urged by the urging member, a collision sound is produced by the contact between the latched portion and the lock member. In a case where a flexible material such as rubber is provided on the distal end portion of the lock member to reduce this collision sound, the volume of the flexible material must be increased in order to attenuate the urging force of the urging member that acts on the lock member. However, in a case where the volume of the flexible material is increased, the moving length needed for the lock member to retain the locked state of the lid body becomes longer, so the lid lock must be increased in size.

That is to say, there is room for improvement to keep the lid lock from increasing in size and reduce the collision sound produced when the latched portion becomes latched by the lock member.

SUMMARY

One embodiment of the present disclosure provides a fuel lid structure that can keep the lid lock from increasing in size and reduce the collision sound produced when the latched portion becomes latched by the lock member.

An aspect of a fuel lid structure includes: a lid body in which a latched portion is formed, the lid body opening and closing an open portion formed in a vehicle body outer panel to access a fuel fill inlet; a lid lock having a lock member provided so as to be movable between a latching position in which the lock member latches the latched portion and a retracted position in which the lock member is retracted from the latched portion and an urging member that urges the lock member toward the latched portion, the lid lock locking the lid body in a closed position in a case where the latched portion is latched by the lock member; and an attenuating member provided on the latched portion, the attenuating member contacting the lock member to attenuate the urging force that acts on the lock member.

BRIEF DESCRIPTION OF THE DRAWINGS

An exemplary embodiment of the present disclosure will be described in detail based on the following figures, wherein:

FIG. 6 is a perspective view of a spring member pertaining to the embodiment;

DETAILED DESCRIPTION

Figure 1:
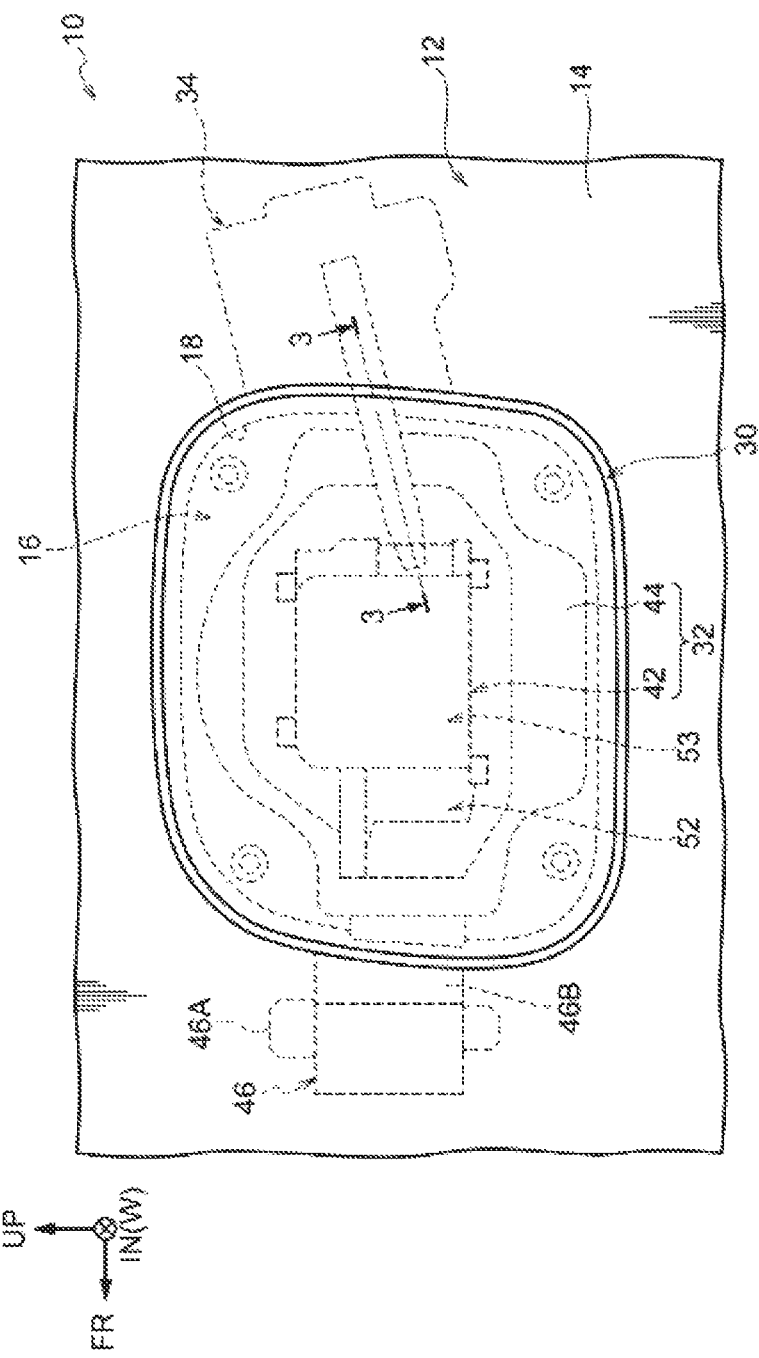
FIG. 1 is an explanatory drawing showing a side portion of a vehicle to which a fuel lid structure pertaining to the embodiment has been applied.

An example of a fuel lid structure pertaining to an embodiment will be described below with reference to the drawings. It will be noted that arrow FR appropriately shown in the drawings indicates a vehicle forward direction, arrow RR indicates a vehicle rearward direction, arrow W indicates a vehicle width direction, and arrow UP indicates a vehicle upward direction. Arrow IN indicates an inward direction in the vehicle width direction. When description is given below simply using the directions of upper and lower, these will be understood to mean upper and lower in the vehicle up and down direction. Furthermore, when description is given below simply using the directions of right and left, these will be understood to mean the right side and the left side in the vehicle width direction in a state facing the traveling direction of the vehicle. The vehicle front and rear direction, the vehicle width direction, and the vehicle up and down direction are orthogonal to each other.

FIG. 1 shows part of a vehicle body outer panel 14 of a vehicle body 12 of a vehicle 10 to which a fuel lid structure 30 pertaining to the present embodiment has been applied. Specifically, FIG. 1 shows a part of the vehicle body 12 on the vehicle width direction left side and further on the rear side than the vehicle front and rear direction central portion of the vehicle body 12.

Figure 3:
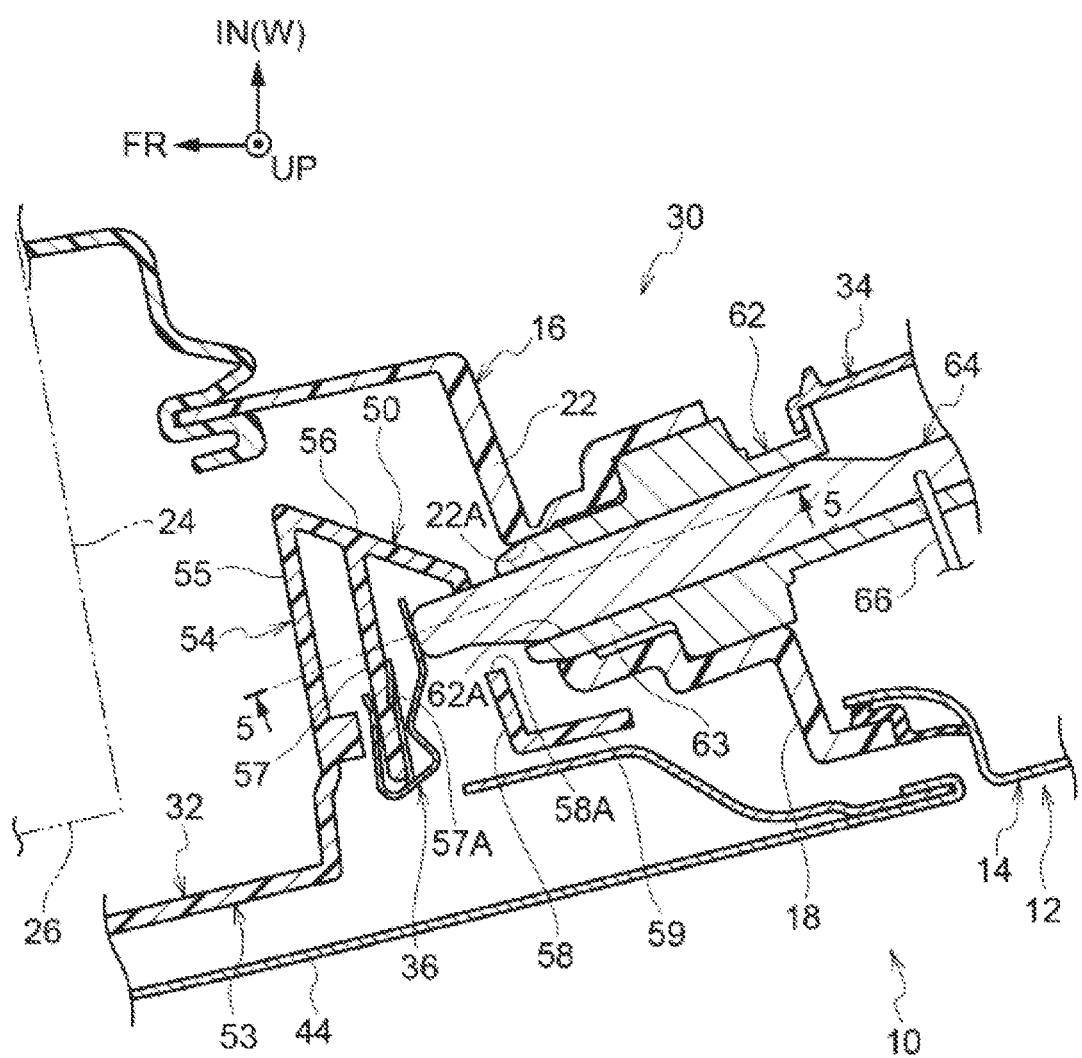
FIG. 3 is a partial transverse sectional view (a sectional view along line 3-3 of FIG. 1) of the fuel lid structure pertaining to the embodiment.

As shown in FIG. 3 as an example, the vehicle body 12 is provided with a lid box 16 sunken inward in the vehicle width direction. The vehicle width direction outer end portion of the lid box 16 will be called an open portion 18. Furthermore, a through hole 22A running in the substantially vehicle front and rear direction is formed in a side wall 22 on the vehicle front and rear direction rear side of the lid box 16. Moreover, a fuel fill pipe 24 is provided in the lid box 16. A fuel fill inlet 26 is formed in the vehicle width direction outer end portion of the fuel fill pipe 24. In other words, the open portion 18 is formed in the vehicle body outer panel 14 to access the fuel fill inlet 26. A fuel cap (not shown in the drawings) is fastened to the fuel fill inlet 26.

{Fuel Lid Structure}

The fuel lid structure 30 shown in FIG. 3 as an example has a lid body 32 that opens and closes the open portion 18, a lid lock 34 that locks (retains) the lid body 32 in a later-described closed position, and a spring member 36 that is an example of an attenuating member.

<Lid Body>

Figure 2:
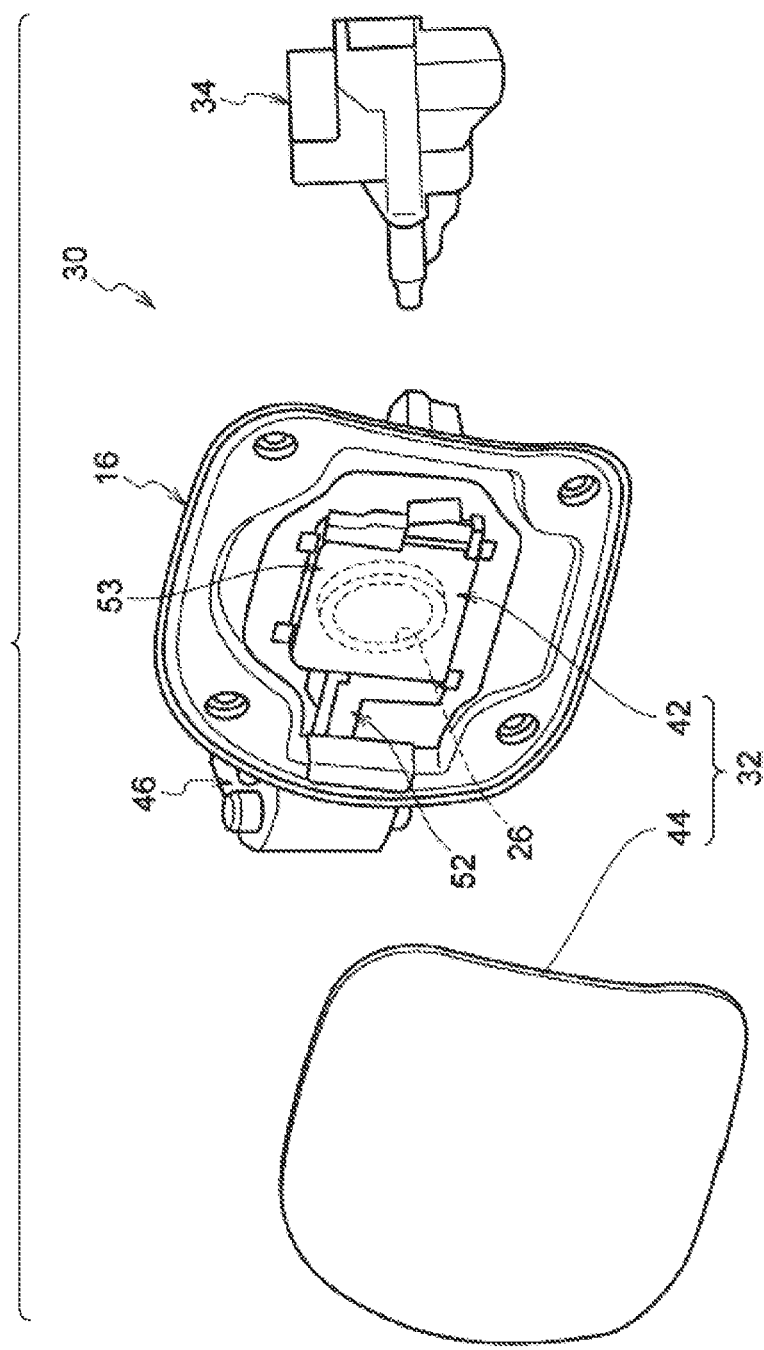
FIG. 2 is an exploded view of the fuel lid structure pertaining to the embodiment.

In the example shown in FIG. 2, the lid box 16, the exploded lid body 32, and the lid lock 34 are shown. The lid body 32 in one example has a resin arm member 42 housed in the lid box 16 and a lid member 44 attached to the vehicle width direction outer side of the arm member 42. Furthermore, the lid body 32 is coupled via a lid hinge 46 to the vehicle front and rear direction front portion of the lid box 16. Moreover, a later-described latched portion 50 (see FIG. 3) is formed in the arm member 42 of the lid body 32.

The lid hinge 46 shown in FIG. 1 as an example is configured by a shaft portion 46A, whose axial direction coincides with the vehicle up and down direction, and a swinging portion 46B, which is swung about the shaft portion 46A when seen from the vehicle up and down direction. Furthermore, a spring for opening (not shown in the drawings) is provided in the lid hinge 46. The spring for opening urges the lid body 32 toward an open position.

(Arm Member)

The arm member 42 has a configuration where an arm portion 52, a tabular portion 53, and a projecting portion 54 (see FIG. 3) are integrated. The arm member 52 is a member that is long in the vehicle front and rear direction, and is formed in a substantially crankshaft shape when seen from the vehicle up and down direction. The vehicle front and rear direction front end portion of the arm portion 52 is passed through a through hole (not shown in the drawings) formed in the vehicle front and rear direction front portion of the lid box 16 and is attached to the swinging portion 46B of the lid hinge 46. Because of this, the arm member 42 is swung in such a way as to follow a circular arc-shaped trajectory about the shaft portion 46A of the lid hinge 46 when seen from the vehicle up and down direction.

The tabular portion 53 is integrated with the vehicle front and rear direction rear end portion of the arm portion 52. Furthermore, the tabular portion 53 extends along the substantially vehicle front and rear direction and the substantially vehicle up and down direction and has a substantially quadrangular shape when seen from the vehicle width direction. The size of the tabular portion 53 is a size that covers the fuel fill inlet 26 (see FIG. 2) when seen from the vehicle width direction.

The projecting portion 54 (see FIG. 3) is formed on the side of the arm member 42 opposite (on the vehicle front and rear direction rear side of) the arm portion 52 side. Furthermore, as shown in FIG. 3 as an example, the projecting portion 54 has a configuration where a front wall 55, a sloping wall 56, a rib 57, a rear wall 58, a side wall 59, and an upper wall 61 (see FIG. 5) are integrated. The front wall 55 is configured by a vertical wall extending along the substantially vehicle width direction and the vehicle up and down direction inward in the vehicle width direction (toward the lid box 16) from the vehicle front and rear direction rear end portion of the tabular portion 53. Furthermore, the vehicle width direction width of the front wall 55 is a size such that the front wall 55 does not contact the lid box 16.

The sloping wall 56 is a vertical wall that slopes, in such a way that its vehicle front and rear direction rear side is positioned further outward in the vehicle width direction than its front side, from the vehicle width direction inner end portion of the front wall 55. Furthermore, the sloping wall 56 in one example extends toward the through hole 22A formed in the side wall 22 of the lid box 16.

The rib 57 is an example of a wall portion, and is a vertical wall extending in a tabular shape outward in the vehicle width direction (in a direction intersecting a later-described lock member 64) from the vehicle front and rear direction substantially central portion of the sloping wall 56. Furthermore, the vehicle width direction width of the rib 57 is shorter than the vehicle width direction width of the front wall 55. A recess portion 57A sunken forward (in the thickness direction of the rib 57) is formed in the vehicle width direction substantially central portion, and in the vehicle front and rear direction rear surface, of the rib 57.

Figure 8:
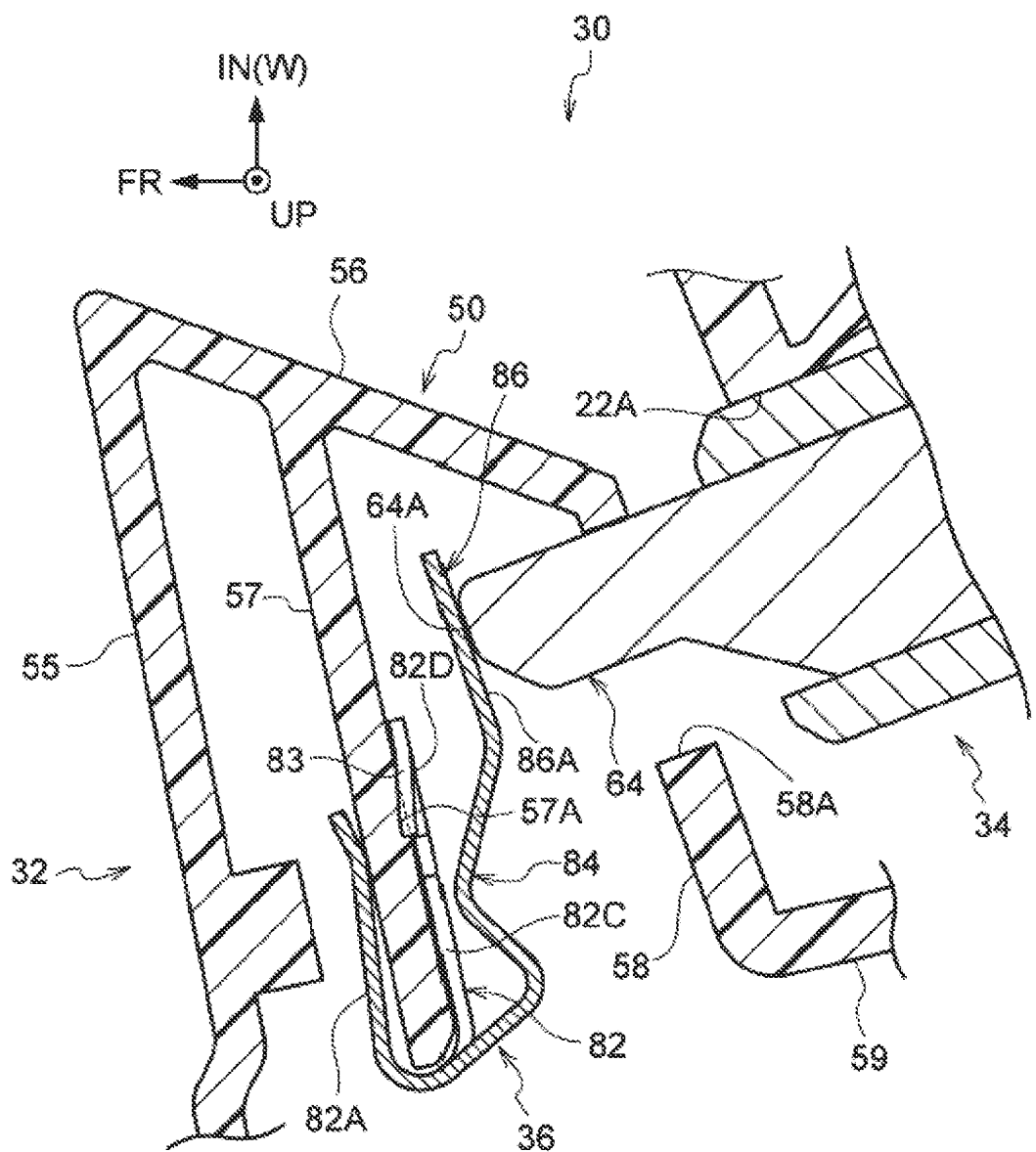
FIG. 8 is an explanatory drawing showing a state in which a lock member has come into contact with the spring member pertaining to the embodiment.

When seen from the vehicle up and down direction, the cross section of the recess portion 57A shown in FIG. 8 as an example is formed in a substantially triangular shape (a wedge shape) that is sunken more on the vehicle width direction outer side than on the vehicle width direction inner side. It will be noted that the recess portion 57A in one example is formed in two places spaced apart from each other in the vehicle up and down direction in the rib 57.

The rear wall 58 shown in FIG. 3 as an example is configured by a vertical wall extending along the substantially vehicle width direction and the vehicle up and down direction outward in the vehicle width direction from the vehicle front and rear direction rear end portion of the sloping wall 56. Furthermore, the rear wall 58 opposes in the vehicle front and rear direction the side wall 22 of the lid box 16. Moreover, in the part of the rear wall 58 that opposes the through hole 22A in the side wall 22 is formed a latching hole 58A into which the later-described lock member 64 is inserted and from which the lock member 64 is removed in the substantially vehicle front and rear direction. The side wall 59 is a vertical wall extending rearward in the vehicle front and rear direction from the vehicle width direction outer end portion of the rear wall 58.

Figure 5:
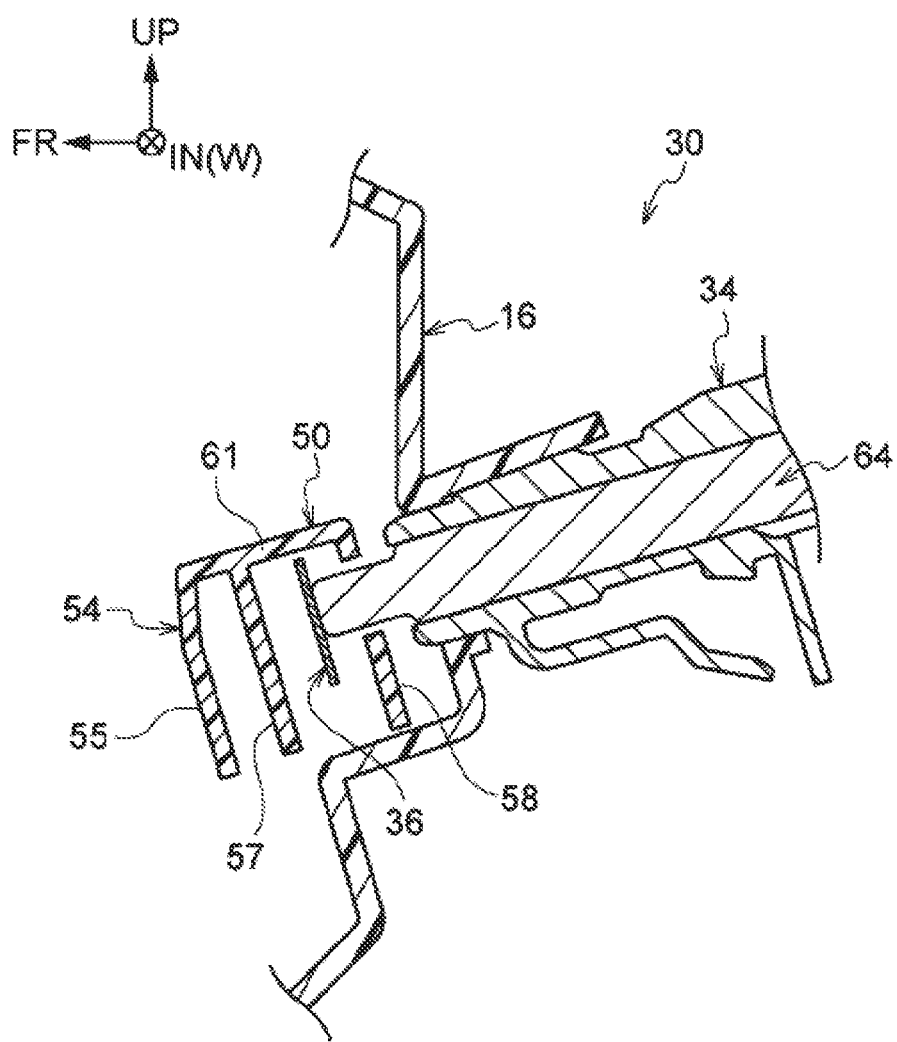
FIG. 5 is a partial longitudinal sectional view (a sectional view along line 5-5 of FIG. 3) of the fuel lid structure pertaining to the embodiment.

As shown in FIG. 5 as an example, the upper wall 61 interconnects the upper end of the front wall 55, the upper end of the rib 57, and the upper end of the rear wall 58.

Here, the part configured by the sloping wall 56, the rib 57, and the rear wall 58 shown in FIG. 3 as an example will be called a latched portion 50. The latched portion 50 becomes latched by the later-described lock member 64. Specifically, part of the hole wall of the latching hole 58A in the rear wall 58 and the distal end portion of the lock member 64 come into contact with each other, whereby the latched portion 50 becomes latched by the lock member 64. Furthermore, the spring member 36 is provided on the rib 57. Details of the spring member 36 will be described later.

(Lid Member)

The lid member 44 shown in FIG. 1 as an example has a shape and size that close the open portion 18 in a state in which the lid member 44 is substantially even with (forms a continuous curved surface with) the vehicle body 12. Furthermore, the lid member 44 is secured to the vehicle width direction outer surface of the tabular portion 53. Additionally, the lid member 44 is configured to move (swing) between a closed position, in which the lid member 44 closes the open portion 18, and an open position, in which the lid member 44 opens the open portion 18, as a result of the lid hinge 46 swinging about the shaft portion 46A.

<Lid Lock>

Figure 4:
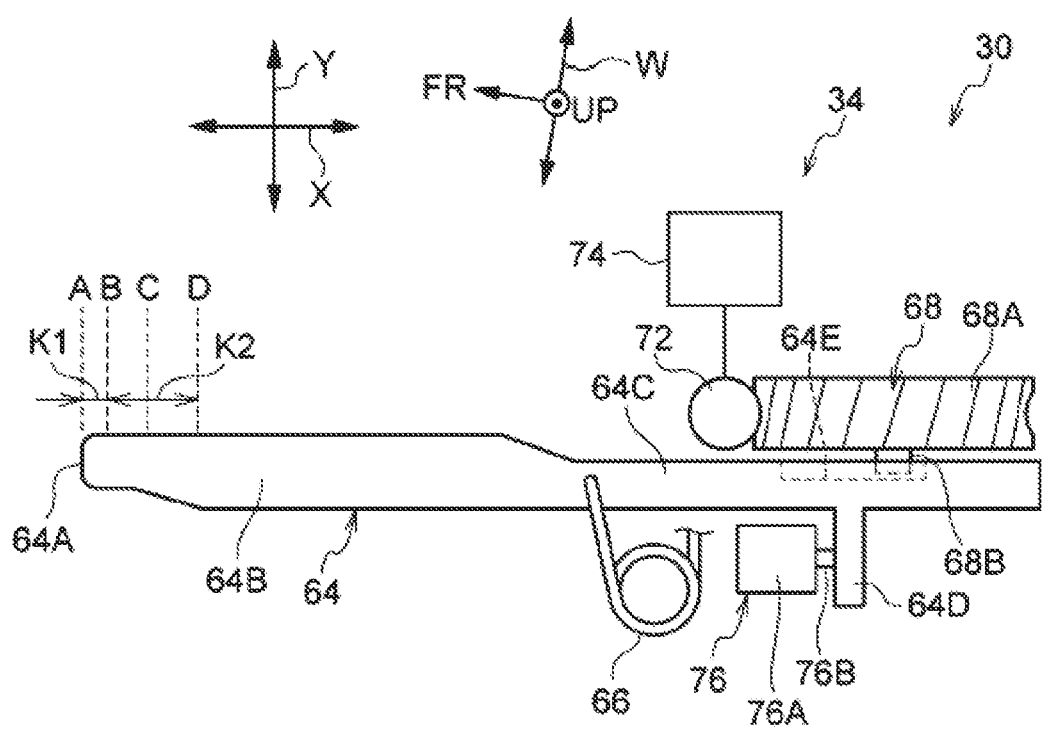
FIG. 4 is an explanatory drawing of a lid lock pertaining to the embodiment.

The lid lock 34 shown in FIG. 4 in one example has a housing 62 (see FIG. 3), a lock member 64, a torsion spring 66, a worm wheel 68, a worm gear 72, a motor 74, and a courtesy switch 76.

The housing 62 shown in FIG. 3 is formed in a hollow box shape that is long in the substantially vehicle front and rear direction. Furthermore, the housing 62 is secured to the side wall 22 of the lid box 16. An open portion 62A is formed in the vehicle front and rear direction front side of the housing 62. The open portion 62A has a size such that the later-described lock member 64 can move through it. Furthermore, the peripheral edge portion of the open portion 62A is fitted into the through hole 22A in the side wall 22. Inside the housing 62 are housed the later-described lock member 64, the torsion spring 66 that is an example of an urging member, the worm wheel 68, the worm gear 72, the motor 74, and the courtesy switch 76 (see FIG. 4 for all of these). Moreover, a guide portion 63 that guides the lock member 64 in a later-described moving direction is formed in the housing 62.

In the example shown in FIG. 4, configurations of the lid lock 34 excluding the housing 62 (see FIG. 3) are shown. In the example shown in FIG. 4, the moving direction, which is also the axial direction, of the lock member 64 is indicated by arrow X. Furthermore, in the example shown in FIG. 4, an intersecting direction (Y direction) intersecting the moving direction (X direction) of the lock member 64 is indicated by arrow Y. It will be noted that in one example the X direction and the Y direction are substantially orthogonal to each other. Furthermore, the X direction in one example slopes relative to the vehicle front and rear direction.

The lock member 64 in one example has a shape where one end side and the other end side in the axial direction of a closed cylinder-shaped member are cut out, and has a distal end surface 64A, a body portion 64B, a rear portion 64C, and a protruding portion 64D. The distal end surface 64A is a surface corresponding to the vehicle front and rear direction front end of the lock member 64.

The body portion 64B is a part corresponding to the vehicle front and rear direction substantially central portion of the lock member 64, and is larger in diameter than the distal end surface 64A. The rear portion 64C is a part corresponding to the vehicle front and rear direction rear portion of the lock member 64, and extends in a substantially tabular shape in the vehicle front and rear direction. Furthermore, a sunken portion 64E that opens inward in the vehicle width direction is formed in the rear portion 64C. The protruding portion 64D is a tabular part that protrudes outward along the substantially vehicle width direction from part of the rear portion 64C and whose thickness direction coincides with the substantially vehicle front and rear direction.

The lock member 64 is, because of the guide portion 63 (see FIG. 3), provided so as to be movable between a latching position in which the lock member 64 latches the later-described latched portion 50 (see FIG. 3) and a retracted position in which the lock member 64 is retracted rearward in the substantially vehicle front and rear direction from the latched portion 50.

The torsion spring 66 has one end portion latched to the rear portion 64C of the lock member 64 and the other end portion latched to the housing 62 (see FIG. 3). Furthermore, the torsion spring 66 urges the lock member 64 forward (toward the later-described latched portion 50 (see FIG. 3)) in the moving direction. In other words, the torsion spring 66 is disposed in such a way that more elastic energy is stored therein (the urging force that acts on the lock member 64 becomes greater) the further the lock member 64 is moved rearward in the moving direction.

The worm wheel 68 is disposed opposing in the intersecting direction (the substantially vehicle width direction) the sunken portion 64E of the lock member 64. Furthermore, the worm wheel 68 is rotatably provided with its axial direction coinciding with the intersecting direction. Moreover, the worm wheel 68 has teeth 68A formed on its outer peripheral surface and a projection 68B projecting from its side surface toward the sunken portion 64E. The projection 68B is disposed inside the sunken portion 64E. The worm gear 72 is disposed with its axial direction coinciding with the vehicle up and down direction and meshes with the teeth 68A. Furthermore, the worm gear 72 is rotated by the motor 74.

The motor 74 is connected to a control unit (not shown in the drawings) that controls the operation of each part of the vehicle 10 (see FIG. 1). Additionally, the motor 74 in one example starts driving when an operation switch (not shown in the drawings) provided on the driver's seat is operated. Specifically, the motor 74 is configured to forwardly rotate the worm gear 72 for a preset first amount of time and thereafter reversely rotate the worm gear 72 for a preset second amount of time. It will be noted that when the worm gear 72 forwardly rotates, the projection 68B moves rearward in the moving direction (the substantially vehicle front and rear direction). Furthermore, when the worm gear 72 reversely rotates, the projection 68B moves forward in the moving direction.

The courtesy switch 76 has a switch body 76A and a detector 76B that projects from the switch body 76A. The detector 76B is disposed opposing in the moving direction (the substantially vehicle front and rear direction) the front surface of the protruding portion 64D of the lock member 64. Additionally, the courtesy switch 76 outputs an ON signal to the control unit when the protruding portion 64D and the detector 76B are in contact with each other and outputs an OFF signal to the control unit when the protruding portion 64D and detector 76B are away from each other.

Here, regarding the positions of the distal end surface 64A, the position at the foremost end in the vehicle front and rear direction in the range in which the lock member 64 is movable will be called position A. Position A is a position in which the distal end surface 64A can be positioned in the open state in which the lid body 32 (see FIG. 3) and the lock member 64 are not in contact with each other. Furthermore, the position of the vehicle front and rear direction rear surface of the rib 57 (see FIG. 3) in the closed state in which the lid body 32 closes the open portion 18 (see FIG. 3) will be called position B.

Moreover, the position of the distal end surface 64A when the urging force of the torsion spring 66 that acts on the lock member 64 and the elastic force of the later-described spring member 36 that acts on the lock member 64 balance each other out and the lock member 64 is stopped from moving will be called position C. In addition, the position at the rearmost end in the vehicle front and rear direction in the range in which the distal end surface 64A is movable will be called position D.

In a case where the distal end surface 64A is positioned in the vicinity of position A (a position excluding position B and the vicinity of position B) in a range K1 between position A and position B, the courtesy switch 76 switches ON. Furthermore, in a case where the distal end surface 64A is positioned in a range K2 between position B and position D, the courtesy switch 76 switches OFF. In the present embodiment, the urging force of the torsion spring 66 and the elastic force of the spring member 36 that act on the lock member 64 are set in such a way that position C is positioned in range K2.

As shown in FIG. 3 as an example, the lid lock 34 locks (retains) the lid body 32 in the closed position when the latched portion 50 has become latched by the lock member 64. Furthermore, the lid lock 34 allows the lid body 32 to be opened when the latched state between the latched portion 50 and the lock member 64 has been cancelled. It will be noted that in the present embodiment, as already mentioned, the lid body 32 is urged toward the open position by the spring for opening (not shown in the drawings) disposed in the lid hinge 46 (see FIG. 1). For this reason, the lid body 32 swings toward the open position when the latched state between the latched portion 50 and the lock member 64 has been cancelled.

<Spring Member>

Figure 7A:
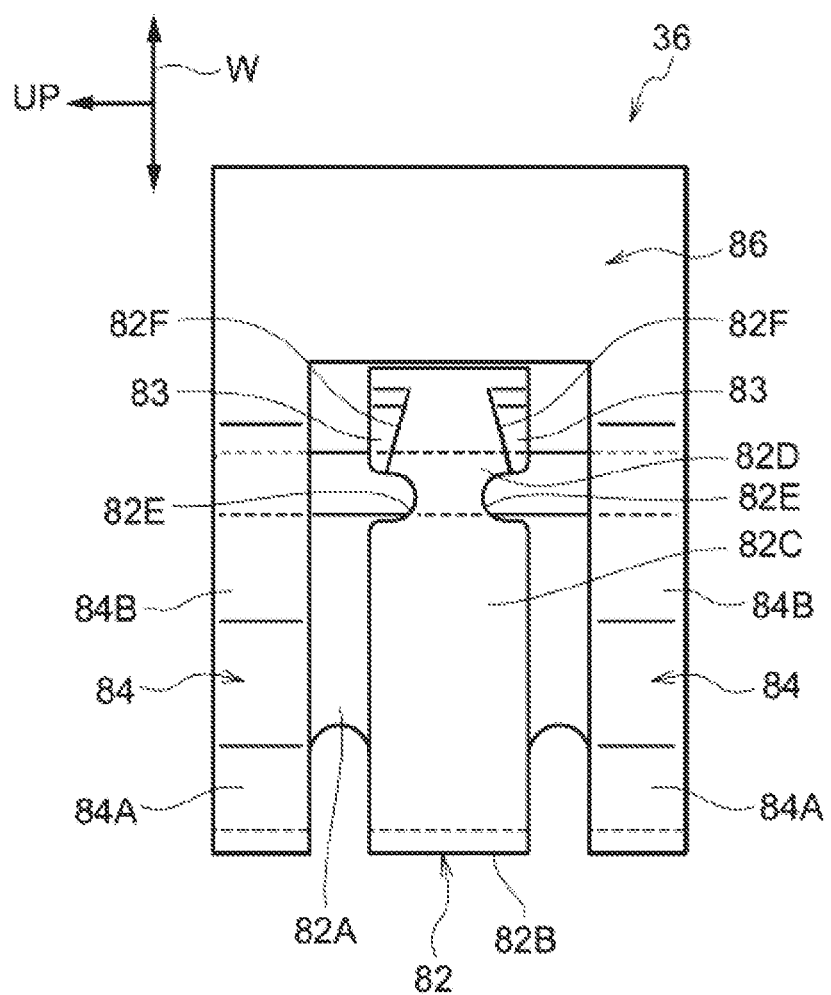
FIG. 7A is a plan view of the spring member pertaining to the embodiment.
Figure 7B:
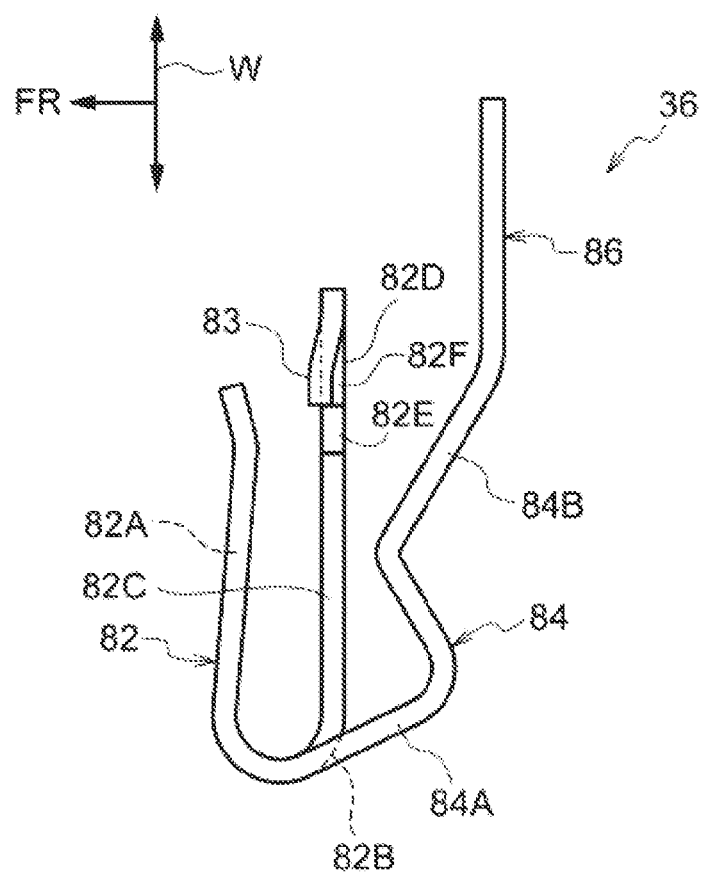
FIG. 7B is a side view of the spring member pertaining to the embodiment.

The spring member 36 will be described with reference to FIG. 6, FIG. 7A, and FIG. 7B. The spring member 36 is made of metal, and in one example is made of stainless steel (SUS). Furthermore, the spring member 36 has an attachment portion 82, elastic portions 84, and a contact portion 86. It will be noted that when directions are given in the description of the various parts of the spring member 36, in order to make dispositions easier to understand it will be supposed that the rib 57 (see FIG. 3) is disposed along the vehicle width direction, and the directions of the various parts will be given in a state in which the spring member 36 is attached to the rib 57.

(Attachment Portion)

The attachment portion 82 has a tabular portion 82A, a curved portion 82B, an opposing portion 82C, and a distal end portion 82D. The tabular portion 82A extends in the vehicle up and down direction and the vehicle width direction. The curved portion 82B is formed on one vehicle width direction end side (the outer side), and continuously with the vehicle up and down direction central portion, of the tabular portion 82A. The vehicle up and down direction width of the curved portion 82B is in one example about ⅓ of the vehicle up and down direction width of the tabular portion 82A. Moreover, the curved portion 82B is formed in a U-shape that opens inward in the vehicle width direction when seen from the vehicle up and down direction.

The opposing portion 82C extends inward in the vehicle width direction from the end portion of the curved portion 82B on the opposite side of the tabular portion 82A side. Furthermore, the opposing portion 82C opposes in the vehicle front and rear direction the tabular portion 82A. The distal end portion 82D extends inward in the vehicle width direction from the end portion of the opposing portion 82C on the opposite side of the curved portion 82B side. Two cutouts 82E sunken inward from both ends in the vehicle up and down direction are formed between the distal end portion 82D and the opposing portion 82C. The vehicle up and down direction width of the distal end portion 82D is about the same as the vehicle up and down direction width of the opposing portion 82C. Additionally, two engaging portions 83 are formed in the distal end portion 82D by two cutouts 82F extending inward in the vehicle width direction from the opposing portion 82C side.

The two engaging portions 83, when seen from the vehicle front and rear direction, are each formed in a substantially trapezoidal shape whose bottom base is positioned on the inner side in the vehicle width direction and whose top base, which is narrower in width in the vehicle up and down direction than the bottom base, is positioned on the outer side (the cutouts 82E side) in the vehicle width direction. Furthermore, the two engaging portions 83 are symmetrically disposed relative to a centerline (not shown in the drawings) lying along the vehicle width direction and passing through the vehicle up and down direction center of the distal end portion 82D. Moreover, the two engaging portions 83, when seen from the vehicle up and down direction, are each bent in such a way that the top base side of the substantially trapezoidal shape is positioned further forward in the vehicle front and rear direction than the bottom base side.

(Elastic Portions)

The elastic portions 84 are parts extending inward in the vehicle width direction from parts on the one end side of the tabular portion 82A located on the vehicle up and down direction upper side and lower side of the curved portion 82B. In other words, the elastic portions 84 are parts that extend from the attachment portion 82 toward the lock member 64 (see FIG. 3) and become elastically deformed in the moving direction of the lock member 64. Furthermore, the elastic portions 84 in one example are formed in a total of two places on the vehicle up and down direction upper side and lower side of the curved portion 82B.

Moreover, the elastic portions 84, when seen from the vehicle up and down direction, each have a first elastic portion 84A, which is formed in a substantially U-shape that opens inward in the vehicle width direction, and a second elastic portion 84B, which extends inward from the vehicle width direction inner end portion of the first elastic portion 84A and is formed in a substantially V-shape that opens in the vehicle rearward direction.

(Contact Portion)

The contact portion 86 is a tabular part that extends in the vehicle up and down direction and the vehicle width direction and interconnects, in the vehicle up and down direction, the vehicle width direction inner end portions of the two elastic portions 84. Furthermore, the contact portion 86 in one example is disposed on the vehicle width direction inner side relative to the distal end portion 82D when seen from the vehicle front and rear direction. Moreover, the contact portion 86 in one example does not oppose the tabular portion 82A when seen from the vehicle front and rear direction.

As shown in FIG. 8 as an example, the spring member 36 is attached to the rib 57. Specifically, the spring member 36 is fitted onto the rib 57 from the vehicle width direction outer side to the inner side and is attached to the rib 57 by sandwiching the rib 57 in the vehicle front and rear direction between the tabular portion 82A and the opposing portion 82C. Moreover, the engaging portions 83 of the spring member 36 are engaged, in the vehicle front and rear direction and the vehicle width direction, with the recess portions 57A of the rib 57.

The contact portion 86 is supported by the elastic portions 84. Furthermore, the contact portion 86 is disposed opposing the distal end surface 64A along the moving direction of the lock member 64 through the latching hole 58A in the rear wall 58. That is to say, the contact portion 86 is disposed on the moving trajectory of the lock member 64 and contacts the lock member 64 when the lock member 64 has moved. Moreover, the contact portion 86 is disposed in such a way that, in a state in which it is in contact with the lock member 64, an angle formed by a contact surface 86A that contacts the lock member 64 and the axial direction (moving direction) of the lock member 64 is a substantially right angle.

Here, the elastic portions 84 become elastically deformed in the moving direction of the lock member 64 (the substantially vehicle front and rear direction) as a result of pressing force from the lock member 64 acting on the contact portion 86. In other words, the spring member 36 is provided on the latched portion 50 and is configured to contact the lock member 64 to attenuate the urging force that acts on the lock member 64.

As already mentioned, in the state in which the open portion 18 (see FIG. 1) is closed by the lid body 32, the stop position of the distal end surface 64A is the position at which the elastic force (urging force) produced by the torsion spring 66 (see FIG. 4) and the elastic force produced by the spring member 36 balance each other out.

Comparative Example

As a comparative example with respect to the fuel lid structure 30 of the present embodiment, in a configuration that does not have the spring member 36, there is no member on the moving trajectory of the lock member 64 to stop the movement of the lock member 64 in front of the rib 57 when the latched portion 50 becomes latched by the lock member 64. Furthermore, in the example shown in FIG. 4, the distal end surface 64A of the comparative example is urged by the torsion spring 66 and tries to move further toward position A beyond position B, which corresponds to the position of the rib 57. For this reason, in the configuration of the comparative example, the elastic energy of the torsion spring 66 corresponding to range K1 becomes consumed as a collision sound when the latched portion 50 (see FIG. 3) becomes latched by the lock member 64. That is to say, in the configuration of the comparative example, the collision sound becomes louder.

{Action and Effects}

Next, the action and effects of the fuel lid structure 30 of the present embodiment will be described.

As shown in FIG. 3 as an example, in the fuel lid structure 30, the lid body 32 closes the open portion 18. In this closed state, the latched portion 50 of the lid body 32 is latched by the lock member 64, and the courtesy switch 76 (see FIG. 4) is switched OFF. Furthermore, the projection 68B of the worm wheel 68 (see FIG. 4) is disposed away from the inner surface of the sunken portion 64E (see FIG. 4) of the lock member 64.

Figure 9A:
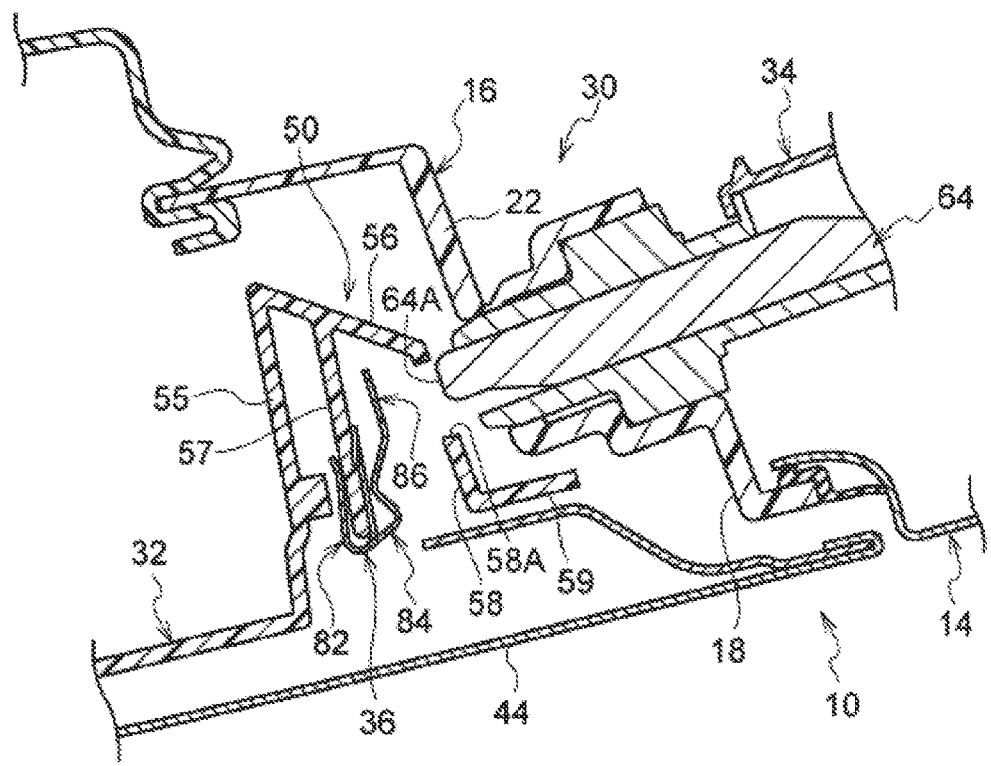
FIG. 9A is an explanatory drawing showing a retracted state in which the lock member pertaining to the embodiment is disposed in a retracted position.

When fuel filling is to be performed, a lid open switch (not shown in the drawings) is operated and the motor 74 shown in FIG. 4 as an example forwardly rotates the worm gear 72 while the first amount of time elapses. Then, the projection 68B comes into contact with the vehicle front and rear direction rear surface of the sunken portion 64E and causes the lock member 64 to move rearward (move backward) in the vehicle front and rear direction. Because of this, as shown in FIG. 9A as an example, the latched state between the latched portion 50 and the lock member 64 is cancelled, the lid body 32 is disposed in the open position, and the open portion 18 becomes opened. That is to say, it becomes possible to access the fuel fill inlet 26 (see FIG. 3), and fuel is supplied through the fuel fill inlet 26 to the vehicle 10.

The motor 74 shown in FIG. 4 as an example reversely rotates the worm gear 72 while the second amount of time elapses after the first amount of time has elapsed. Because of this, the worm wheel 68 is turned so that the projection 68B is moved forward from the rear surface of the sunken portion 64E. At this time, the lid body 32 (see FIG. 3) is not on the moving trajectory of the lock member 64, so the distal end surface 64A of the lock member 64 moves as far as position A because of the urging force of the torsion spring 66. Additionally, the courtesy switch 76 is switched ON by contact between the detector 76B and the protruding portion 64D, and a warning lamp (a lamp that gives notification of the open state; not shown in the drawings) inside the vehicle 10 (see FIG. 1) lights up.

Next, in a case where the lid body 32 that is in the open position has been pushed toward the lid box 16 in order to close, with the lid body 32, the open portion 18 shown in FIG. 9A as an example, the lock member 64 and the sloping wall 56 come into contact with each other. At this time, a reaction force from the sloping wall 56 acts on the lock member 64, and this reaction force is greater than the urging force of the torsion spring 66 (see FIG. 4), so the lock member 64 moves toward the retracted position counter to the urging force of the torsion spring 66. It will be noted that at this time the urging force that acts on the lock member 64 from the torsion spring 66 becomes greater compared to the urging force in the case where the lid body 32 is in the open position.

Figure 9B:
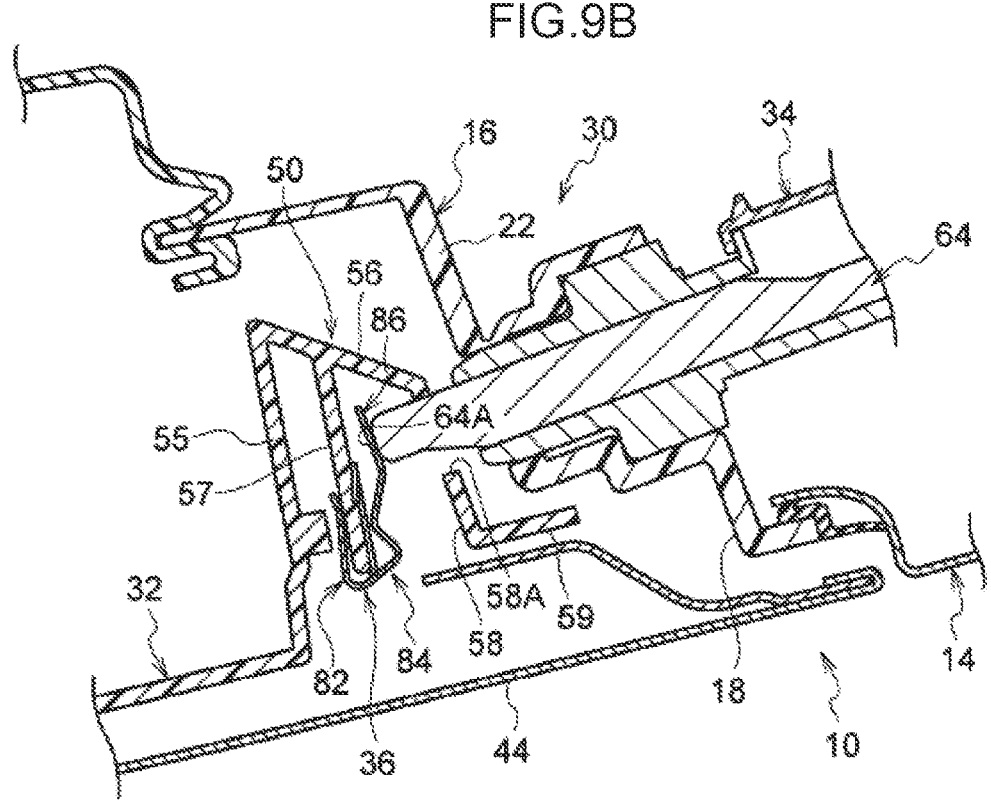
FIG. 9B is an explanatory drawing showing a latched state in which the lock member pertaining to the embodiment is disposed in a latching position.

Next, the place at which the distal end surface 64A contacts the latched portion 50 changes from the sloping wall 56 to the rear wall 58, and the lock member 64 enters the inside of the latching hole 58A. That is to say, the lock member 64 moves toward the latching position. In other words, the lock member 64 moves toward the rib 57. The contact portion 86 of the spring member 36 is positioned between the distal end surface 64A and the rib 57. For this reason, as shown in FIG. 9B as an example, the distal end surface 64A comes into contact with the contact portion 86. Then, the latched portion 50 becomes latched by the lock member 64. At this time, the urging force that acts on the lock member 64 is greater compared to the urging force in the case where the lid body 32 is in the open position, so the lock member 64 moves with great force toward the latched portion 50. It will be noted that in the example shown in FIG. 9B illustration of the torsion spring 66 (see FIG. 4) is omitted.

Here, when the contact portion 86 has come into contact with the distal end surface 64A, the elastic portion 84 causes elastic force in the opposite direction of the urging direction to act on the lock member 64. In other words, the urging force that acts on the lock member 64 is attenuated by the elastic force of the spring member 36. Additionally, in position C (see FIG. 4) the urging force and the elastic force balance each other out and the movement of the lock member 64 is stopped. In this way, the impact force that acts on the latched portion 50 is reduced compared to a configuration that does not have the spring member 36, so the collision sound produced when the latched portion 50 becomes latched by the lock member 64 can be reduced.

Moreover, the spring member 36 is provided on the latched portion 50 and is not provided on the lock member 64 that moves. For this reason, compared to a configuration where the spring member 36 is provided on the lock member 64, the lock member 64 does not need to be increased in size, so the lid lock 34 can be kept from increasing in size.

Furthermore, in the fuel lid structure 30, the spring member 36 is made of metal. For this reason, the attenuating characteristics of the spring member 36 are less susceptible to the effects of the temperature and humidity in the area around the lid body 32, so compared to a configuration where the spring member 36 is made of resin, the weatherability of the spring member 36 can be enhanced.

In addition, in the fuel lid structure 30, the engaging portions 83 (see FIG. 8) of the spring member 36 are engaged with the recess portions 57A (see FIG. 8) formed in the rib 57 of the latched portion 50, whereby the attachment portion 82 of the spring member 36 is attached to the rib 57. In a case where the lock member 64 has moved and come into contact with the contact portion 86, as already mentioned, the urging force acting on the lock member 64 becomes attenuated by the elastic force of the elastic portions 84.

Here, the impact force that acted on the contact portion 86 as a result of the contact portion 86 and the lock member 64 shown in FIG. 8 as an example having come into contact each other is transmitted from the contact portion 86 through the elastic portions 84 to the engaging portions 83. At this time, the engaging portions 83 are engaged with the recess portions 57A of the rib 57 in the intersecting direction intersecting the moving direction of the lock member 64, so compared to a configuration that does not have the engaging portions 83, the opposing portion 82C and the distal end portion 82D are kept from coming away from the rib 57. Because of this, the position at which the spring member 36 is attached to the rib 57 of the latched portion 50 can be kept from shifting because of the contact between the spring member 36 and the lock member 64.

Furthermore, in the fuel lid structure 30, the urging force of the torsion spring 66 and the elastic force of the spring member 36 that act on the lock member 64 are set in such a way that the balanced-out position C shown in FIG. 4 as an example is positioned in range K2. For this reason, even in a case where the urging force produced by the torsion spring 66 is large, the contact portion 86 (see FIG. 8) and the rib 57 (see FIG. 8) can be kept from coming into contact with each other.

Example Modifications

It will be noted that the technology of the present disclosure is not limited to the embodiment described above.

In the fuel lid structure 30, the spring member 36 may also be made of resin in a case where fluctuations in the temperature and humidity in the area around the lid body 32 are small. Furthermore, the spring member 36 is not limited to being made of SUS and may also be configured by another metal.

The spring member 36 is not limited to a configuration where it is fitted (attached) in the vehicle width direction to the rib 57 and may also have a configuration where it is attached in the vehicle up and down direction to the rib 57 or a configuration where it is attached in the vehicle front and rear direction to the rib 57.

The attenuating member is not limited to a tabular spring-like configuration like the spring member 36 and may also be configured by an elastomer.

Provided that the fuel lid structure 30 has a configuration where the lid lock 34 does not increase in size, the collision sound may also be reduced even more by providing a flexible material in the distal end portion of the lock member 64, exposing the flexible material to the outside from the distal end surface 64A, and allowing the flexible material to come into contact with the spring member 36.

A fuel lid structure pertaining to an embodiment and example modifications of the technology of the present disclosure has been described above, but the embodiment and example modifications may also be appropriately combined and used, and the fuel lid structure can of course be implemented in a variety of ways to the extent that they do not depart from the spirit of the technology of the present disclosure.

All documents, patent applications, and technical standards mentioned in this specification are incorporated herein by reference to the same extent as if each individual document, patent application, or technical standard were specifically and individually indicated to be incorporated by reference.

A fuel lid structure pertaining to a first aspect includes: a lid body in which a latched portion is formed, the lid body opening and closing an open portion formed in a vehicle body outer panel to access a fuel fill inlet; a lid lock having a lock member provided so as to be movable between a latching position in which the lock member latches the latched portion and a retracted position in which the lock member is retracted from the latched portion and an urging member that urges the lock member toward the latched portion, the lid lock locking the lid body in a closed position in a case where the latched portion is latched by the lock member; and an attenuating member provided on the latched portion, the attenuating member contacting the lock member to attenuate the urging force that acts on the lock member.

In the fuel lid structure pertaining to the first aspect, in a state in which the lid body is disposed in an open position and the open portion has been opened, it becomes possible to access the fuel fill inlet, and fuel is supplied through the fuel fill inlet to the vehicle. In this state, the latched state between the lock member and the latched portion is cancelled and the lock member is urged by the urging member and moved toward the fuel fill inlet. Here, in a case where the lid body that is in the open position has been pushed toward the closed position, part of the latched portion of the lid body, or a part other than the latched portion, and the distal end portion of the lock member come into contact with each other, whereby the lock member is moved toward the retracted position counter to the urging force of the urging member. At this time, the urging force that acts on the lock member from the urging member becomes greater compared to the urging force in the case where the lid body is in the open position.

When the lid body is disposed in the closed position, the lock member moves to the latching position and the latched portion becomes latched by the lock member. At this time, the urging force that acts on the lock member is greater compared to the urging force in the case where the lid body is in the open position, so the lock member moves with great force toward the latched portion. Here, the attenuating member provided on the latched portion contacts the lock member and attenuates the urging force that acts on the lock member. For this reason, the impact force that acts on the latched portion is reduced compared to a configuration that does not have the attenuating member, so the collision sound produced when the latched portion becomes latched by the lock member can be reduced.

Moreover, the attenuating member is provided on the latched portion and is not provided on the lock member that moves. For this reason, compared to a configuration where the attenuating member is provided on the lock member, the lock member does not need to be increased in size, so the lid lock can be kept from increasing in size.

The attenuating member in a fuel lid structure pertaining to a second aspect is configured by a spring member made of metal.

In the fuel lid structure pertaining to the second aspect, by virtue of the attenuating member being a spring member made of metal, the attenuating characteristics of the attenuating member are less susceptible to the effects of the temperature and humidity in the area around the lid body, so compared to a configuration where the attenuating member is made of resin, the weatherability of the attenuating member can be enhanced.

The latched portion in a fuel lid structure pertaining to a third aspect has a wall portion extending in a tabular shape in an intersecting direction intersecting a moving direction of the lock member and in which is formed a recess portion sunken in a thickness direction of the wall portion, and the spring member has an attachment portion in which is formed an engaging portion that engages with the recess portion in the intersecting direction and which is attached to the wall portion, an elastic portion that extends from the attachment portion toward the lock member and becomes elastically deformed in the moving direction, and a contact portion that is supported by the elastic portion and contacts the lock member.

In the fuel lid structure pertaining to the third aspect, the engaging portion of the spring member is engaged with the recess portion formed in the wall portion of the latched portion, whereby the attachment portion of the spring member is attached to the wall portion. In a case where the lock member has moved and come into contact with the contact portion, the urging force acting on the lock member becomes attenuated by the elastic force of the elastic portion. Here, the impact force that has acted on the contact portion as a result of the contact portion and the lock member having come into contact with each other is transmitted from the contact portion through the elastic portion to the engaging portion. At this time, the engaging portion is engaged with the recess portion of the wall portion in the intersecting direction intersecting the moving direction of the lock member, so compared to a configuration that does not have the engaging portion, part of the spring member is kept from coming away from the wall portion. Because of this, the position at which the spring member is attached to the wall portion of the latched portion can be kept from shifting because of the contact between the spring member and the lock member.

According to the fuel lid structure pertaining to the first aspect, the lid lock can be kept from increasing in size and the collision sound produced when the latched portion becomes latched by the lock member can be reduced.

According to the fuel lid structure pertaining to the second aspect, the weatherability of the attenuating member can be enhanced.

According to the fuel lid structure pertaining to the third aspect, the position at which the spring member is attached to the wall portion of the latched portion can be kept from shifting because of the contact between the spring member and the lock member.

What is claimed is:

1. A fuel lid structure, comprising:
   a lid body at which a latched portion is formed, the lid body opening and closing an open portion formed in a vehicle body outer panel for access to a fuel fill inlet;
   a lid lock having:
      a lock member provided so as to be movable between a latching position in which the lock member latches with the latched portion and a retracted position in which the lock member is retracted from the latched portion, and
      an urging member that urges the lock member toward the latched portion,
      the lid lock locking the lid body in a closed position in a case in which the latched portion is latched by the lock member; and
   an attenuating member provided at the latched portion, the attenuating member contacting the lock member to attenuate the urging force that acts on the lock member, wherein
   the attenuating member is configured by a spring member made of metal.

2. The fuel lid structure of claim 1, wherein:
   the latched portion has a wall portion extending in a tabular shape in an intersecting direction that intersects a movement direction of the lock member, a recess portion being formed in the wall portion and the recess portion being recessed in a thickness direction of the wall portion, and
   the spring member has:
      an attachment portion at which an engaging portion is formed that engages with the recess portion in the intersecting direction, the attachment portion being attached to the wall portion;
      an elastic portion that extends from the attachment portion toward the lock member and becomes elastically deformed in the movement direction; and
      a contact portion that is supported by the elastic portion and contacts the lock member.

3. The fuel lid structure of claim 2, wherein a cross section of the recess portion as seen from a vehicle vertical direction is a triangular shape that is more recessed on a vehicle width direction outer side than on a vehicle width direction inner side.

4. The fuel lid structure of claim 2, wherein the elastic portion, as seen from a vehicle vertical direction, has a first elastic portion, which has a U-shape that opens inward in a vehicle width direction, and a second elastic portion, which extends inward from a vehicle width direction inner end portion of the first elastic portion and has a V-shape that opens in a vehicle rearward direction.

5. The fuel lid structure of claim 1, wherein the attenuating member and the latched portion are separately provided.

* * * * *